Dec. 25, 1962   J. A. YOUNG ETAL   3,069,831
AEROSOL FILTER
Filed Sept. 1, 1959   2 Sheets-Sheet 2
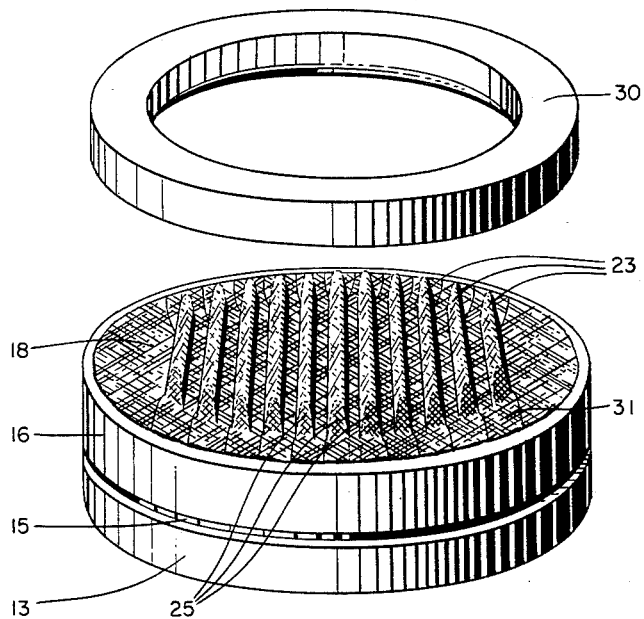
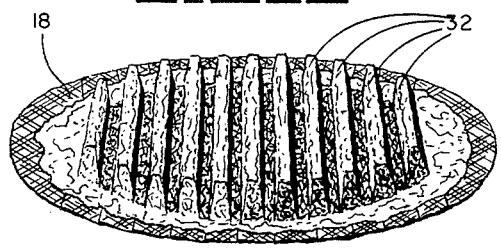
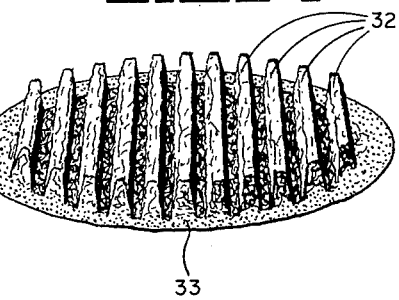
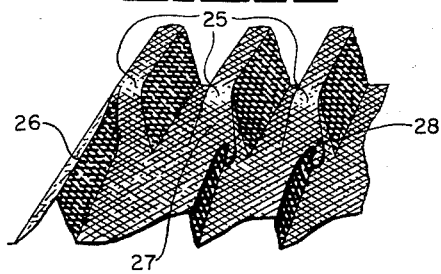
INVENTORS
JAMES A. YOUNG
ROBERT T. LUCAS
BY Richard E. Reed
ATTORNEY

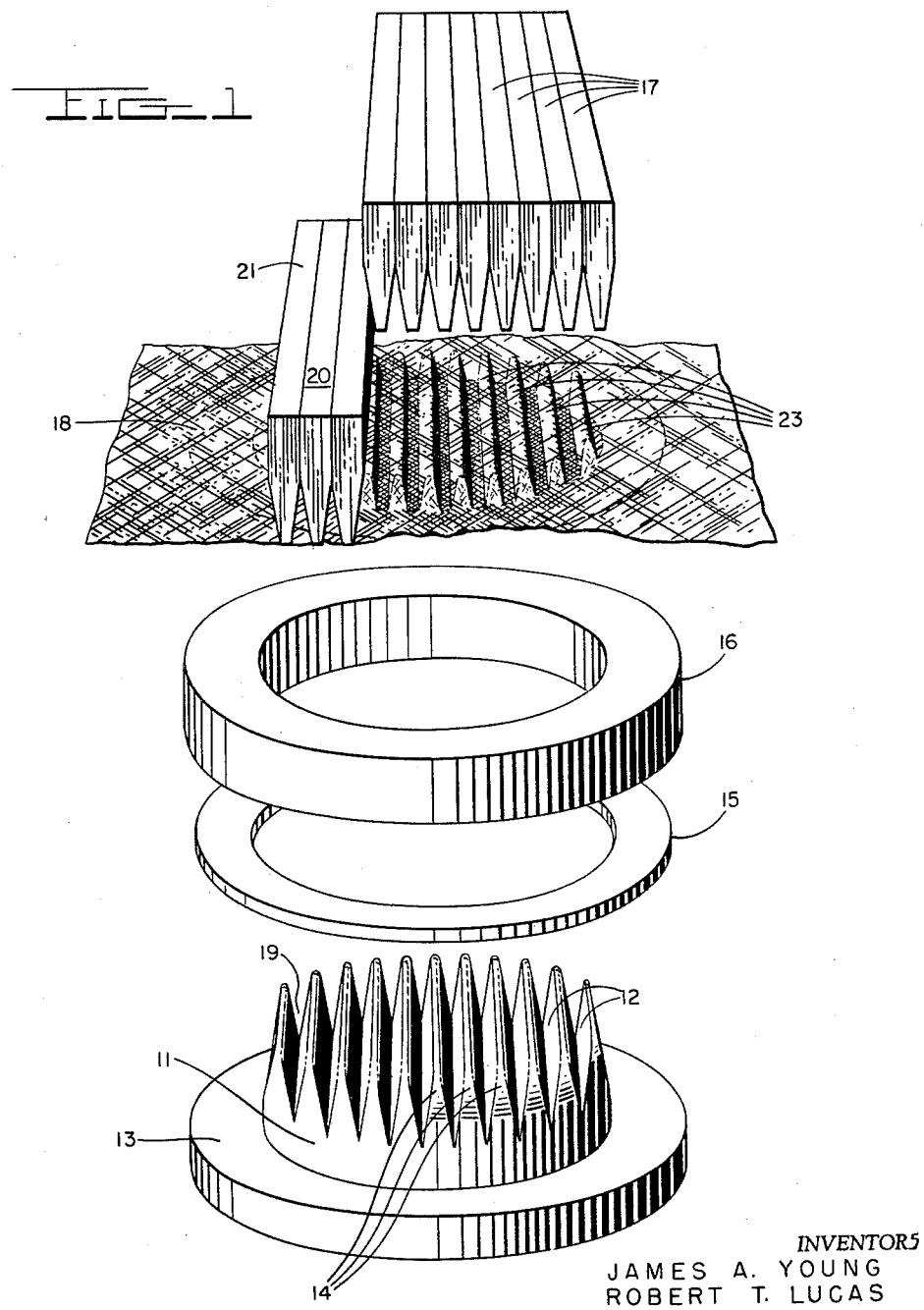

United States Patent Office 3,069,831
Patented Dec. 25, 1962

3,069,831
AEROSOL FILTER
James A. Young, Washington, D.C., and Robert T. Lucas, Alexandria, Va., assignors to the United States of America as represented by the Secretary of the Navy
Filed Sept. 1, 1959, Ser. No. 837,562
7 Claims. (Cl. 55—521)
(Granted under Title 35, U.S. Code (1952), sec. 266)

The invention described herein may be manufactured and used by or for the Government of the United States of America for governmental purposes without the payment of any royalties thereon or therefor.

The present invention relates to an improved aerosol filter, in particular, to an aerosol filter unit made entirely of glass fibers.

The aerosol filter unit in accordance with the present invention is adapted for use in gas mask canisters, respirator housings, etc. and is capable of high efficiency in removing solid and liquid particulate matter, such as, dust, smoke, soot, bacteria, tars, oils, etc. from the air, while the novel filter design contributes to the comfort and safety of its user by reducing the breathing resistance. In addition, the filter unit may be modified to fit any compact space and may be prepared to serve any required degree of filtration by properly adjusting the glass fiber mixture to any given thickness of the filter unit.

The novel design of the filter imparts mechanical stability to the composition without the need for any binder material or structural support that lends weight and bulk to the filter structure without contributing directly to the filtering process. The all-glass fiber composition provides essentially a filter unit which is compact, resistant to chemical action, strong and flexible to withstand shock under service conditions and which, moreover, is of minimum weight.

The principal object of the invention is to provide an efficient aerosol filter with a considerably lower resistance to the flow of air than other filters of comparable size.

Another object is to provide a novel filter unit in which the filter unit is molded from a water dispersion of fine glass fibers.

Another object is to provide an all-glass filter whose fiber composition includes no binder material or structural elements therein and the fiber unit requires no supporting members.

Another object resides in the provision of a filter unit from a combination of different size glass fibers to meet various filtering requirements.

Further objects and advantages and a fuller understanding of the present invention will become apparent by referring to the following detailed description when considered in connection with the accompanying drawings in which like reference numerals designate lake parts throughout the figures thereof, and wherein:

FIGURE 1 illustrates the apparatus for forming the wire screen matrix, in an exploded view of the apparatus after the corrugations have been formed in the wire screen;

FIGURE 2 illustrates the shaped wire screen on the die after the ends of the corrugations are lapped over and pressed against the flat margin;

FIGURE 3 illustrates the fiber glass deposit on the wire screen matrix;

FIGURE 4 is a perspective view of the fiber glass filter after it is removed from the wire screen matrix;

FIGURE 5 shows in an enlarged view and in stepwise manner the lapping of the open ends of the corrugations.

The present invention concerns a glass fiber filter molded as a circular disk and having on the filtering surface thereof a series of raised parallel ridges of substantially uniform thickness that form a corrugated filter surface with a flat, circular sealing edge. The corrugations on the filter surface provide for an increased surface area through which the air may be filtered. By varying the diameters of the glass fibers in the filter composition, the surface is regulated in porosity and adapted to filter tobacco smoke, bacteria, dust—particulate matter having diameters of less than 5 microns. The distinctly different design and composition of the present filter achieve a considerable decrease in the breathing resistance in addition to the high filtration performance. The filtering characteristics of the present aerosol filter are described and compared in the detailed description that follows.

Considering further the process of molding the filter unit, a water dispersion of very fine fibers of glass, slag, or other mineral wool composition, is formed and poured over a wire screen member; upon draining of the water medium through the wire screen, the fiber glass, or other mineral wool composition will deposit on the wire screen and conform to the surface contour of the wire screen member.

The wire screen member which is the matrix for molding the fiber filter in accordance with the present invention is initially shaped on a die block; an annealed metallic screen is bent into a series of equally spaced parallel ridges, forming thereby corrugated, circular, wire disk of uniform thickness with a flat outer margin. The wire screen is permanently fixed to any desired corrugation thickness and may be used to fabricate filter units of identical shape and size.

It is also within the scope of the present invention that glass, or other mineral wool fibers, of appropriate diameters, can be blended and molded to form durable fiber matting that requires no binding material or supporting element. By proper selection of fiber diameters and blending the same in proper proportions, the porosity of the matting can be adjusted to any desired degree of filtration. Furthermore, fibers of certain average length and of small diameters are held together in the matting by attractive forces which come into prominence in finely divided matter, so that proper selection and treatment of very fine fiber material results in an adhering fiber mat that does not flake or crumble.

The parts of a preferred embodiment of the apparatus for forming a wire screen into a matrix suitable for molding filter units as described herein are shown in an exploded view in FIG. 1. The die block 11 that may be cast or machined from metal or other durable material is formed into a series of equally spaced parallel grooves 12 and surrounding the central prominence is a low marginal lip 13. The die block illustrated herein has eleven grooves, each groove reaching a depth of $11/16$ of an inch, however, the number of grooves and actual depth thereof are not restricted in the practice of the invention as described herein. The outer edge of the grooved portion of the die block is bevelled or preferably rounded, as shown at 14. Spacers, such as the one shown at 15, of any desired thickness may be inserted on the marginal lip below the abutment ring 16, in order to adjust the depth to which the wire screen may descend. Abutment ring 16 is then placed into position forming the level to which wedge dies 17 may descend. A bronze wire screen 18, or one of any other suitable metal is initially annealed to obtain a more flexible screen, the screen is then formed on the die block 11 by inserting wedge dies 20 into the grooves. Wedge die 21, for example, depresses the wire screen into groove 19 until said die comes to rest on the abutment ring. Each of the remaining insert dies is then pressed into a groove in succession; each additional portion of the screen as it is formed is stressed in only one direction, and the shaped screen does not deform or tear. When wedge dies 17 are removed, as illustrated in FIG. 1, the depressions in the wire screen produce a corrugated surface 23.

The open ends of the corrugations are then lapped on the rounded lateral surface 25 of each ridge, as illustrated in FIG. 2. Care should be exercised to avoid overlapping the wire folds of two vicinal ends and to prevent the screen from folding or bending on the lateral surface, except the desired crease. FIGURE 5 shows in an enlarged view the initial crease at 25 in which the open end is creased on the side nearer the center of the disk; the creased fold is then brought over the lateral surface as shown at 27 and 28 and the fold that extends on the margin is pressed and smoothed out on the flat surface. Finally, press ring 30 is brought down on the margin to compress the margin folds 31 and form a smooth, flat surface and the wire screen is trimmed to form margin 18. The shaped wire screen of FIG. 2 is removed from the die block and electroplated with a layer of nickel or any other suitable plating metal. Nickel plating produces a more rigid form and the metal screen is more resistant to acidified dispersions. A bronze screen originally of 60 mesh is plated with nickel to produce a plated screen of approximately 80 mesh.

In considering the selection of fiber blends which form useful filter compositions, fibers of selective average diameters not exceeding much over 3 microns are employed in blends comprising two distinct average diameters: The larger of the two contains average fiber diameters of about 1 to about 3 microns and is present in the composition in considerably larger amounts; the lesser component therein has average fiber diameters of approximately .15 to 0.50 micron. Preferably, the range for the larger diameter size is between 2–3 microns, with a range of between .15 and .35 micron for the smaller average fiber diameters. A most effective fiber blend that produces filter units of high filtration efficiency and low air flow resistance consists of the following combination of fiber diameters and relative amounts:

Average fiber diameters: Percent
  2 microns _____ 80°
  0.35 micron _____ 80°

In processing commercially available fiber glass in the ranges of average fiber diameters, as disclosed above, the fibers are initially subjected to a beating process in a lab Waring Blendor or standard paper beater in order to reduce the fibers to a lower and more uniform fiber length. The fibers which are usually in the range of about 5/16 to 1/8 inch in length are reduced to the more desirable average length of about 1/8 inch. Each fiber glass size is weighed and mixed with enough water, acidified to a pH 3 and then beaten until optimum fiber length is obtained. It is of great importance that the beating process should not be carried beyond the point where optimum fiber length is obtained because the fibers can easily be reduced to ineffective lengths. With a lab Waring Blendor the fibers are properly treated in approximately 5 minutes. With larger fiber quantities that require a standard paper beater, the processing can be determined mainly by testing the tensile strength of flat disks formed from the processing fibers.

Following the beating process, fibers of different average diameters are blended in the desired ratios. It is not necessary that the different fibers be processed separately, for equally effective results are also obtained when fiber blends of any desired ratio are beaten together in the manner described above. The processed fibers are diluted sufficiently with water to form an easily filtrable water-dispersion when poured into a cylinder which has the wire matrix attached to the open bottom thereof. Of course, the quantity of fibers which are placed into the cylinder depends on the size and the thickness of the desired filter unit. After the water has drained from the dispersion, the fibers are now deposited on the wire matrix and have assumed the shape of the matrix, as shown in FIG. 3. The filter unit consists of ridges 32 of substantially uniform thickness and a flat sealing margin which is trimmed to any desired width. The filter is now air dried on the matrix or it may be partly air dried on the matrix and then removed to be heat-dried thoroughly. The filter is readily removed from the wire matrix without clinging or becoming embedded in the screen spaces.

*Example*

Referring now to an illustrative example of the invention as disclosed herein and to the improved results obtained therefrom:

A glass fiber mixture consisting of 83.3% of a fiber having an average fiber diameter of 2 microns and of 16.7% of a fiber having an average fiber diameter of 0.35 micron was initially combined as dry fiber and then dispersed in 600 ml. of water. The dispersion was acidified to a pH 3 with hydrochloric acid, placed in a lab Waring Blendor and beaten for 5 minutes. The dispersion was then diluted further to 7 liters with water and poured into a cylinder which retains the matrix at the open base thereof. The water was permitted to drain through the wire screen while the fiber material deposited on the matrix. The deposited fiber matting was retained on the matrix and air blown until it had partly dried.

The filter unit was then thoroughly dried and tested for filtration and air flow characteristics. The dried filter unit that was fabricated in this instance weighed 5.3 grams and had a substantially uniform thickness of 20 mil. The air flow resistance at 24 liters per minute was 10 mm. of water and the efficiency of removing particulate matter of 0.3 micron is 99.987. The particular design and dimensions of the corrugated filter, as illustrated in FIG. 4, has 11 raised ridges or corrugations, shown at 32, each ridge is about 7/16 inch in height, and the filter has an overall corrugated diameter of 4 3/16 inches. The sealing margin surrounding the corrugated diameter is trimmed, as shown in FIG. 4, and coated with a latex or other suitable rubber cement composition, shown at 33, to form an improved sealing means in canisters and respirator housings.

It will now be appreciated that the illustrated structure of FIG. 4 affords eminently improved filtration performance with remarkably low air flow resistance. It may be explained that due to modifications which are possible with the number and height of the corrugations and the selection of appropriate fiber compositions, the filter unit may be fabricated to any precise requirement of construction and performance.

It is of course understood that the exact dimensions and performance data of the filter unit presented in the illustrative example relates to a preferred embodiment of the invention and that numerous modifications or alterations may be made therein without departing from the spirit and scope of the invention as set forth in the appended claims.

What is claimed is:

1. An aerosol filter unit molded of a mixture of glass fibers in which said mixture consists of average fiber diameters in the range between about 1 and about 3 microns and in the range between about 0.15 and about 0.50 micron, in a continuous relatively thin matting having a plurality of raised parallel ridges of rectangular cross section, said ridges having bevelled ends in a substantially circular filter area and a flat margin at the outer periphery of said filter area.

2. An aerosol filter unit molded of a mixture of glass fibers in which said mixture consists of average fiber diameters in the range between about 2 and 3 microns and in the range between about 0.15 and 0.35 micron, in a continuous relatively thin matting having a plurality of raised parallel ridges of rectangular cross section in a substantially circular filter area and a flat margin at the outer periphery of said filter area.

3. An aerosol filter unit consisting of about 80% by weight of glass fibers having average fiber diameters of about 2 microns and about 20% by weight of glass fibers having average fiber diameters of about 0.35 micron, in a continuous relatively thin molded matting having a plurality of parallel corrugations of rectangular cross section, and of substantially uniform height and thickness in a substantially circular filter area and a flat margin at the outer periphery of said filter area.

4. An aerosol filter unit molded of glass fiber blends which consist of average fiber diameters in a selected micron range and average fiber diameters in a selected submicron range in a continuous relatively thin matting having a plurality of parallel corrugations of rectangular cross section, and of substantially uniform height and thickness in a substantially circular filter area and a flat margin at the outer periphery of said filter area.

5. An aerosol filter as claimed in claim 3, in which the flat margin has a thin coating of rubber cement.

6. An aerosol filter composition consisting of a mixture of glass fibers, about 80% by weight of said fibers having average fiber diameters in the range of about 2 to 3 microns and about 20% by weight of said fibers having average fiber diameters in the range of about 0.15 to 0.35 micron, said composition having high efficiency in the removal of particulate matter of 5 to 0.3 microns.

7. An aerosol filter composition consisting of a mixture of glass fibers, about 80% by weight of said fibers having average fiber diameters of about 2 microns and about 20% by weight of said fibers having average fiber diameters of about 0.35 micron, said composition having a substantially uniform thickness of about 20 mil and a high efficiency in the removal of particulate matter of 0.3 micron.

References Cited in the file of this patent
UNITED STATES PATENTS

| | | |
|---|---|---|
| 1,109,372 | Thurman | Sept. 1, 1914 |
| 1,781,254 | Stelzner | Nov. 11, 1930 |
| 2,032,262 | Cori | Feb. 25, 1936 |
| 2,692,654 | Pryor | Oct. 26, 1954 |
| 2,694,630 | Landes et al. | Nov. 16, 1954 |
| 2,704,396 | Lahaye | Mar. 22, 1955 |
| 2,706,156 | Arledter | Apr. 12, 1955 |
| 2,754,581 | Thomas | July 17, 1956 |
| 2,774,443 | Slayter | Dec. 18, 1956 |
| 2,784,132 | Maisel | Mar. 5, 1957 |
| 2,797,163 | Smith et al. | June 25, 1957 |
| 2,821,261 | Vixler et al. | Jan. 28, 1958 |
| 2,823,117 | Labino | Feb. 11, 1958 |
| 2,882,997 | Smith et al. | Apr. 21, 1959 |

UNITED STATES PATENT OFFICE
CERTIFICATE OF CORRECTION

Patent No. 3,069,831                            December 25, 1962

James A. Young et al.

It is hereby certified that error appears in the above numbered patent requiring correction and that the said Letters Patent should read as corrected below.

Column 3, line 43, for "$80°$" read -- 80 --; line 44, for "$80°$" read -- 20 --.

Signed and sealed this 25th day of February 1964.

(SEAL)
Attest:
ERNEST W. SWIDER

EDWIN L. REYNOLDS

Attesting Officer

Acting Commissioner of Patents